United States Patent
Zang et al.

(10) Patent No.: US 9,900,099 B2
(45) Date of Patent: Feb. 20, 2018

(54) METHOD AND SYSTEM FOR SCHEDULING DATA MESSAGE IN PON AND EOC NETWORKING, AND RELATED DEVICE

(71) Applicant: ZTE Corporation, Shenzhen, Guangdong (CN)

(72) Inventors: Meiyan Zang, Shenzhen (CN); Liquan Yuan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 26 days.

(21) Appl. No.: 14/890,013

(22) PCT Filed: Sep. 13, 2013

(86) PCT No.: PCT/CN2013/083510
§ 371 (c)(1),
(2) Date: Nov. 9, 2015

(87) PCT Pub. No.: WO2014/183360
PCT Pub. Date: Nov. 20, 2014

(65) Prior Publication Data
US 2016/0127043 A1    May 5, 2016

(30) Foreign Application Priority Data
May 17, 2013  (CN) .......................... 2013 1 0186232

(51) Int. Cl.
*H04B 10/27* (2013.01)
*H04L 12/28* (2006.01)
*H04Q 11/00* (2006.01)

(52) U.S. Cl.
CPC ......... *H04B 10/27* (2013.01); *H04L 12/2801* (2013.01); *H04Q 11/0067* (2013.01)

(58) Field of Classification Search
CPC .. H04Q 11/0067; H04B 10/27; H04L 12/2801
See application file for complete search history.

(56) References Cited

U.S. PATENT DOCUMENTS

2009/0296733 A1    12/2009  Yu
2012/0257891 A1    10/2012  Boyd
(Continued)

FOREIGN PATENT DOCUMENTS

CN    101150516 A    3/2008
CN    101494594 A    7/2009
(Continued)

OTHER PUBLICATIONS

International Search Report in international application No. PCT/CN2013/083510, dated Feb. 27, 2014.
(Continued)

*Primary Examiner* — Shi K Li
*Assistant Examiner* — Mina Shalaby
(74) *Attorney, Agent, or Firm* — Oppedahl Patent Law Firm LLC (57) ABSTRACT

Disclosed is method for scheduling a data message in a Passive Optical Network (PON) and Ethernet Over Cable (EOC) networking, which may include: an Optical Coax Unit (OCU) allocating a coaxial side Logical Link Identifier (LLID) for a Coaxial Network Unit (CNU) which accessed the OCU, and acquiring an optical network side LLID allocated for the OCU by an Optical Line Terminal (OLT); and establishing a mapping relationship between the coaxial side LLID and the optical network side LLID, and scheduling a data message of the CNU according to the mapping relationship. Also disclosed are a system for scheduling a data message in a PON and EOC networking and a related device. By means of the technical solution provided in the embodiments of the present disclosure, an optical network side of the OCU is effectively separated from a coaxial side thereof, the OLT in an existing PON will not be influenced, an existing Multi-Point Control Protocol (MPCP) will not be
(Continued)

modified, and effective control and allocation for resources are implemented.

14 Claims, 4 Drawing Sheets

(56) References Cited

U.S. PATENT DOCUMENTS

| | | | |
|---|---|---|---|
| 2012/0257893 | A1 | 10/2012 | Boyd |
| 2013/0004155 | A1 | 1/2013 | Liang et al. |
| 2013/0142515 | A1* | 6/2013 | Chen .................. H04B 10/27 398/67 |
| 2015/0180576 | A1 | 6/2015 | Boyd et al. |
| 2015/0326405 | A1* | 11/2015 | Ko ................... H04Q 11/0071 398/66 |

FOREIGN PATENT DOCUMENTS

| | | |
|---|---|---|
| CN | 101494595 A | 7/2009 |
| EP | 2509259 A1 | 10/2012 |

OTHER PUBLICATIONS

English Translation of the Written Opinion of the International Search Authority in international application No. PCT/CN2013/083510, dated Feb. 27, 2014.

Supplementary European Search Report in European application No. 13884729.8, dated May 30, 2016.

* cited by examiner

METHOD AND SYSTEM FOR SCHEDULING DATA MESSAGE IN PON AND EOC NETWORKING, AND RELATED DEVICE

TECHNICAL FIELD

The present disclosure relates to communications technology, and particularly relates to a method and a system for scheduling a data message in a Passive Optical Network (PON) and an Ethernet Over Cable (EOC) networking, and an Optical Coax Unit (OCU).

BACKGROUND

Figure 1:
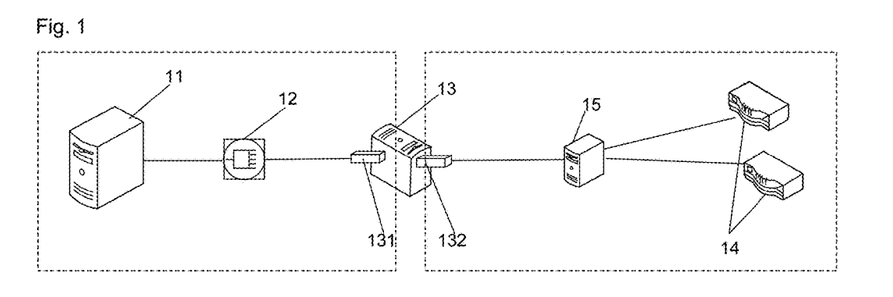
FIG. 1 is a schematic diagram of PON and EOC networking in the prior art.

A basic tendency of next generation network development is an IP based all-service network. With respect to a cable operator, in order to sufficiently use a large number of household cables thereof, a network transformation scheme of PON and EOC hybrid networking, and the PON and EOC hybrid networking is usually expressed as "PON+EOC," wherein the PON is referred to as an optical side, and the EOC is referred to as a coaxial side. FIG. 1 is a schematic diagram of PON+EOC networking in the related art, a PON network and an EOC network are included in this networking; wherein, the PON includes: an Optical Line Terminal (OLT) 11, an Optical Distributed Network (ODN) 12, and an optical layer part device Optical Network Unit (ONU) 131 in an Optical Coax Unit (OCU), and data are transmitted between the OLT and the ODN, between the ODN and the ONU through an optical cable; the EOC network includes: an Coaxial Network Unit (CNU) 14, and an electrical layer part device Coaxial Line Terminal (CLT) 132 in the OCU 13; transmission is performed between the CNU and the CLT through an coaxial cable. Preferably, a specific form of the PON+EOC hybrid networking is: in a networking form of PON+a Ethernet Passive Network Over Coax (EPOC), the EPOC network, in addition to all devices of the EOC, further includes a Coaxial Distributed Unit (CDU) 15 between the CNU and the OCU.

Currently, a problem existing in the prior art is that inside of the OCU, during transmission of data, there is not presented a solution completely and effectively controlling adaptation and resource management between an optical layer part and an electrical layer part.

SUMMARY

In schematic diagram of the above, a main purpose of an exemplary embodiment of the present disclosure is to provide a method and a system for scheduling a data message in a PON and EOC networking, and an OCU, which can effectively control and allocate resources.

In order to achieve the above purpose, a technical solution of the present disclosure is implemented as follows:

An embodiment of the present disclosure provides a method for scheduling a data message in a Passive Optical Network (PON) and Ethernet Over Cable (EOC) networking, which may include that:

allocating, by an Optical Coax Unit (OCU), one or more coaxial side Logical Link Identifiers (LLID) for one or more Coaxial Network Units (CNU) having accessed the OCU, and acquiring one or more optical network side LLIDs allocated for the OCU by an Optical Line Terminal (OLT); and establishing a mapping relationship between the coaxial side LLIDs and the optical network side LLIDs, and scheduling a data message of one of the CNUs according to the mapping relationship.

Preferably, the step of acquiring the one or more optical network side LLIDs allocated for the OCU by the OLT may include:

allocating, by the OLT, the one or more optical network side LLIDs for the OCU according to the one or more coaxial side LLIDs allocated for the one or more CNUs by the OCU, and transmitting the allocated one or more optical network side LLIDs to the OCU.

Preferably, the step of allocating the one or more optical network side LLIDs for the OCU may be: allocating, for the OCU, the optical network side LLIDs adaptive to the number of the coaxial side LLIDs.

Preferably, the step of allocating, by the OCU, the one or more coaxial side LLIDs for the one or more CNUs having accessed the OCU may include:

allocating, by the OCU, the one or more coaxial side LLIDs for the one or more CNUs registered on the OCU, according to a Multi-Point Control Protocol (MPCP) discovery process executed by the CNUs.

Preferably, the step of allocating, by the OLT, the one or more optical network side LLIDs for the OCU, according to the one or more coaxial side LLIDs allocated for the one or more CNUs by the OCU, may include:

acquiring, by the OLT, the number of coaxial side LLIDs allocated for the one or more CNUs by the OCU, according to an MPCP discovery process executed by the OCU, and allocating, for the OCU, optical network side LLIDs of which the number is not less than that of the coaxial side LLIDs.

Preferably, the step of scheduling the data message of the CNU according to the mapping relationship may include:

after the OCU receives the data message transmitted by the CNU, acquiring the coaxial side LLID of the CNU from the data message, searching out the optical network side LLID corresponding to the coaxial side LLID according to the mapping relationship between the coaxial side LLIDs and the optical network side LLIDs, replacing the coaxial side LLID in the data message with the searched out optical network side LLID, and transmitting data message to the OLT.

Preferably, the step of scheduling the data message of the CNU according to the mapping relationship may include:

after the OCU receives the data message transmitted by the OLT, acquiring the optical network side LLID from the data message, searching out the coaxial side LLID corresponding to the optical network side LLID according to the mapping relationship between the coaxial side LLIDs and the optical network side LLIDs, replacing the optical network side LLID in the data message with the searched out coaxial side LLID, and transmitting data message to the CNU.

An embodiment of the present disclosure further provides an Optical Coax Unit (OCU), which may include: an identification allocation module, an identification acquisition module, a mapping module, and a scheduling module, wherein the identification allocation module is configured to allocate one or more coaxial side Logical Link Identifiers (LLID) for one or more Coaxial Network Units (CNU) having accessed the OCU;

the identification acquisition module is configured to acquire one or more optical network side LLIDs allocated for the OCU by an Optical Line Terminal (OLT);

the mapping module is configured to establish a mapping relationship between the coaxial side LLIDs and the optical network side LLIDs; and the scheduling module is configured to schedule a data message of one of the CNUs according to the mapping relationship.

Preferably, the identification allocation module may be configured to allocate the one or more coaxial side LLIDs for the one or more CNUs registered on the OCU, according to a Multi-Point Control Protocol (MPCP) discovery process executed by the CNUs.

Preferably, the scheduling module may be configured to, after receiving the data message transmitted by the CNU, acquire the coaxial side LLID of the CNU from the data message, search out the optical network side LLID corresponding to the coaxial side LLID according to the mapping relationship between the coaxial side LLIDs and the optical network side LLIDs stored in the mapping module, replace the coaxial side LLID in the data message with the searched out optical network side LLID, and transmit data message to the OLT.

Preferably, the scheduling module may be configured to, after receiving the data message transmitted by the OLT, acquire the optical network side LLID from the data message, search out the coaxial side LLID corresponding to the optical network side LLID according to the mapping relationship between the coaxial side LLIDs and the optical network side LLIDs stored in the mapping module, replace the optical network side LLID in the data message with the searched out coaxial side LLID, and transmit data message to the CNU.

An embodiment of the present disclosure further provides a system for scheduling a data message in a Passive Optical Network (PON) and Ethernet Over Cable (EOC) networking, which may include: an Optical Line Terminal (OLT), an Optical Coax Unit (OCU), and a Coaxial Network Unit (CNU), wherein the OCU is configured to allocate one or more coaxial side Logical Link Identifiers (LLID) for one or more CNUs having accessed the OCU, and acquire one or more optical network side LLIDs allocated for the OCU by the OLT; establish a mapping relationship between the coaxial side LLIDs and the optical network side LLIDs, and schedule a data message of the CNU according to the mapping relationship;

the OLT is configured to allocate the one or more optical network side LLIDs for the OCU; and the CNU is configured to access the OCU, and acquire the coaxial side LLID allocated by the OCU.

Preferably, the OLT may be configured to allocate, for the OCU, the one or more optical network side LLIDs adaptive to the number of the coaxial side LLIDs according to the one or more coaxial side LLIDs allocated for the one or more CNUs by the OCU, and transmit the allocated optical network side LLIDs to the OCU.

Preferably, the OCU may be configured to allocate the one or more coaxial side LLID for the one or more CNUs registered on the OCU, according to a Multi-Point Control Protocol (MPCP) discovery process executed by the CNUs; and the OLT is configured to acquire the number of coaxial side LLIDs allocated for the one or more CNUs by the OCU, according to an MPCP discovery process executed by the OCU, and allocate, for the OCU, optical network side LLIDs of which the number is not less than that of coaxial side LLIDs.

Preferably, the OCU may be configured to after receiving the data message transmitted by the CNU, acquire the coaxial side LLID of the CNU from the data message, search out the optical network side LLID corresponding to the coaxial side LLID according to the mapping relationship between the coaxial side LLIDs and the optical network side LLIDs, replace the coaxial side LLID in the data message with the searched out optical network side LLID, and transmit data message to the OLT.

Preferably, the OCU may be configured to, after receiving the data message transmitted by the OLT, acquire the optical network side LLID from the data message, search out the coaxial side LLID corresponding to the optical network side LLID according to the mapping relationship between the coaxial side LLIDs and the optical network side LLIDs, replace the optical network side LLID in the data message with the searched out coaxial side LLID, and transmit data message to the CNU.

In the method and the system for scheduling the data message in the PON and EOC networking and the OCU provided by the embodiments of the present disclosure, the OCU allocates a coaxial side LLID for a CNU which has accessed the OCU, and acquires an optical network side LLID allocated for the OCU by an OLT; and establishes a mapping relationship between the coaxial side LLIDs and the optical network side LLIDs, and schedules a data message of the CNU according to the mapping relationship. The technical solution of the embodiments of the present disclosure allows an optical network side and a coaxial side of the OCU to be separated effectively from each other, will neither influence an OLT in an existing PON, nor modify an existing MPCP. Thus, effective control and allocation for resources may be implemented.

DETAILED DESCRIPTION

The present disclosure is further illustrated in detail taken in conjunction with accompanying drawings and specific embodiments below.

Figure 2:
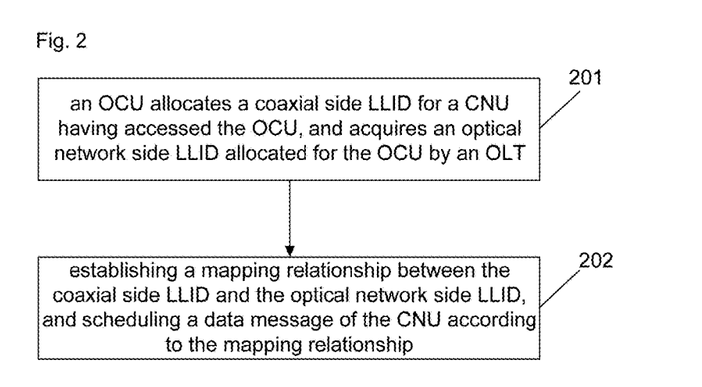
FIG. 2 is a flowchart of a method for scheduling a data message in the PON and EOC networking according to an embodiment of the present disclosure.

FIG. 2 is a flowchart of a method for scheduling a data message in the PON and EOC networking according to an embodiment of the present disclosure. As shown in FIG. 2, the method includes the following steps:

Step 201: an OCU allocates a coaxial side LLID for a CNU which has accessed the OCU, and acquires an optical network side LLID allocated for the OCU by an OLT.

In this embodiment, the step of acquiring the optical network side LLID allocated for the OCU by the OLT includes:

the OLT allocates the optical network side LLID for the OCU according to the coaxial side LLID allocated for the CNU by the OCU, and transmits the allocated optical network side LLID to the OCU.

Herein, the step of allocating the optical network side LLID for the OCU is: allocating, for the OCU, the optical network side LLID adaptive to the number of the coaxial side LLIDs.

For example, when five CNUs access to the OCU, then the OCU allocates five coaxial side LLIDs for the five CNUs; the OLT allocates the optical network side LLID for the OCU according to the number of the coaxial side LLIDs allocated for the CNU by the OCU, and the number of the allocated optical network side LLIDs is adaptive to the number of the coaxial side LLIDs.

Herein, the step of allocating, by the OCU, the coaxial side LLID for the CNU accessing to the OCU includes:

the OCU allocates the coaxial side LLID for the CNU registered on the OCU, according to an MPCP discovery process executed by the CNU.

Herein, the coaxial side LLID may be an Ethernet Passive Network Over Coax-Logical Link Identifier (EPOC-LLID).

In this embodiment, the step of allocating, by the OLT, the optical network side LLID for the OCU, according to the coaxial side LLID allocated for the CNU by the OCU, includes:

the OLT acquires the coaxial side LLID allocated for the CNU by the OCU, according to an MPCP discovery process executed by the OCU, and allocates, for the OCU, the optical network side LLIDs of which the number is not less than that of the coaxial side LLIDs.

For example, when five CNUs access to the OCU, then the OCU allocates a coaxial side LLID for each one of the five CNUs; the OLT allocates five optical network side LLIDs for the OCU, according to the five coaxial side LLIDs allocated for the five CNUs by the OCU, and transmits the optical network side LLIDs to the OCU, to allow, in the OCU, the coaxial side LLID and the optical network side LLID respectively allocated for the CNU to be one to one correspondence; or the number of the optical network side LLIDs is larger than five, so that when other CNU accesses the OCU, the OCU can have enough number of the optical network side LLIDs to be mapped to the coaxial side LLID allocated for the other CNU.

Herein, the optical network side LLID may be an Ethernet Passive Optical Network-Logical Link Identifier (EPON-LLID).

Step 202: establishing a mapping relationship between the coaxial side LLID and the optical network side LLID, and scheduling a data message of the CNU according to the mapping relationship.

In this embodiment, the step of scheduling the data message of the CNU according to the mapping relationship includes:

after the OCU receives the data message transmitted by the CNU, the OCU acquires the coaxial side LLID of the CNU from the data message, searches out the optical network side LLID corresponding to the coaxial side LLID according to the mapping relationship between the coaxial side LLID and the optical network side LLID, replaces the coaxial side LLID in the data message with the searched out optical network side LLID, and transmits data message to the OLT.

Specifically, in an uplink direction, a data message transmitted by a terminal user reaches the CNU, the OCU allocates an uplink resource according to the coaxial side LLID allocated for the CNU, and the CNU forwards the data message according to an operating mode itself; if the CNU operates in a Frequency Division Duplexing (FDD) mode, then the CNU directly transmits the data message to the coaxial side of the OCU for caching; if the CNU operates in a Time Division Duplexing (TDD) mode, then the OCU allocates an uplink time slot resource according to the coaxial side LLID allocated for the CNU, and in a range of the time slot, the CNU transmits the data message to the coaxial side of the OCU for caching.

After the OCU receives the data message transmitted by the CNU, the OCU acquires the coaxial side LLID of the CNU from the data message, searches out the optical network side LLID corresponding to the coaxial side LLID according to the mapping relationship between the coaxial side LLID and the optical network side LLID, replaces the coaxial side LLID in the data message with the searched out optical network side LLID; the OLT allocates an uplink resource according to the optical network side LLID allocated for the OCU, performs a Dynamic Bandwidth Allocation (DBA) scheduling on the data message, and in a range of the uplink resource, the OCU transmits the data message to the OLT, and the OLT then in turn forwards the data message to an up-layer device. Herein, a process for the DBA scheduling is identical to a DBA mechanism in an EPON in the related art, and will not be repeated.

Further, the step of scheduling the data message of the CNU according to the mapping relationship includes:

After the OCU receives the data message transmitted by the OLT, the OCU acquires the optical network side LLID from the data message, searches out the coaxial side LLID corresponding to the optical network side LLID according to the mapping relationship between the coaxial side LLID and the optical network side LLID, replaces the optical network side LLID in the data message with the searched out coaxial side LLID, and transmits the data message to the CNU.

Specifically, after downlink data pass through a core network and a carrier network, and reach the OLT, the OLT performs downlink data shaping according to a parameter configuration of the optical network side LLID corresponding to the coaxial side LLID of a target CNU of the data message. Herein, the parameter includes but is not limited to a Committed Information Rate (CIR) and a Peak Information Rate (PIR), and the shaped data message is transmitted to the OCU.

After the OCU receives the data message transmitted by the OLT, the OCU acquires the optical network side LLID from the data message, searches out the coaxial side LLID corresponding to the optical network side LLID according to a mapping relationship between the coaxial side LLID and the optical network side LLID, replaces the optical network side LLID in the data message with the searched out coaxial side LLID, and performs transmission according to an operating mode of the CNU.

If the operating mode of the CNU is an FDD mode, then the OCU directly transmits the data message to the CNU, and the CNU forwards the data message to a target terminal.

If the operating mode of the CNU is a TDD mode, then the OCU selects a time slot range not conflicting against the uplink time slot resource according to an uplink time slot resource allocation situation of the coaxial side LLID, transmits a downlink data message to the CNU, and the CNU forwards the data message to a target terminal.

Figure 3:
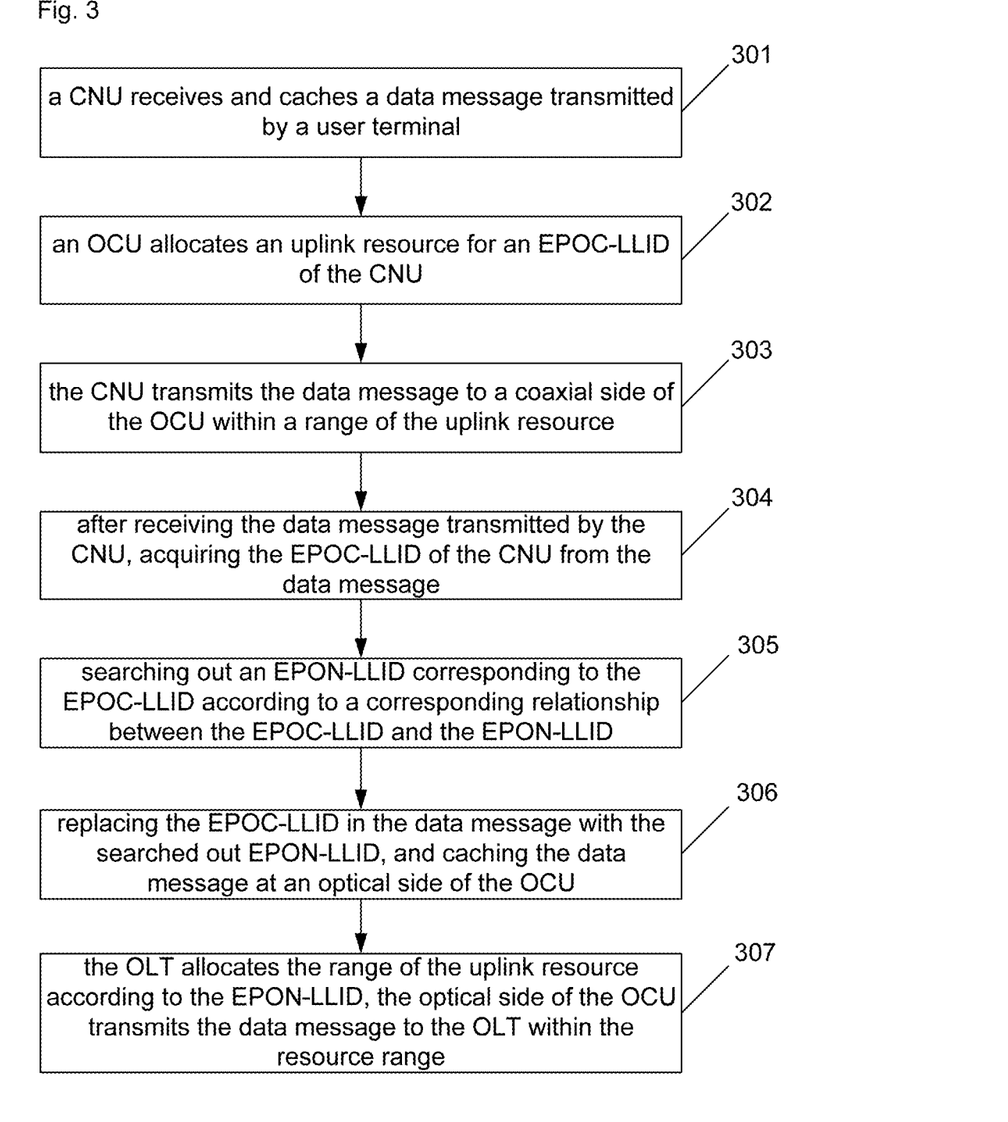
FIG. 3 is a flowchart of a method for scheduling an uplink data message in the PON and EOC networking according to an embodiment of the present disclosure.

FIG. 3 is a flowchart of a method for scheduling an uplink data message in a PON and EOC networking according to an embodiment of the present disclosure. As shown in FIG. 3, the method includes the following steps:

Step 301: a CNU receives and caches a data message transmitted by a user terminal.

In this embodiment, before the CNU receives and caches the data message transmitted by the user terminal, the OCU allocates one or more coaxial side LLIDs for the CNU registered on the OCU, according to an MPCP discovery process executed by the CNU, and the coaxial side LLIDs are identified by an EPOC-LLID.

The OLT acquires the number of the coaxial side LLIDs allocated for the CNU by the OCU according to the MPCP discovery process executed by the OCU, and allocates, for the OCU, the optical network side LLIDs, of which the number is not less than that of the coaxial side LLID, and transmits the allocated optical network side LLID to the OCU, and the optical network side LLIDs are identified by the EPON-LLID.

The OCU establishes and stores a one to one mapping relationship between the EPOC-LLID and the EPON-LLID.

Steps 302-303: the OCU allocates an uplink resource according to the EPOC-LLID of the CNU and the CNU transmits the data message to a coaxial side of the OCU within a range of the uplink resource.

In this embodiment, the CNU forwards the data message according to an operating mode itself. If the CNU is in an FDD mode, then the CNU directly transmits the data message to a coaxial side of the OCU to be cached. If the CNU operates in a TDD mode, then the OCU allocates an uplink time slow resource according to the coaxial side LLID allocated for the CNU, and transmits the data message to the coaxial side of the OCU for caching within a range of a time slot. This embodiment mainly illustrates the present disclosure in detail by taking the CNU in the TDD mode as an example.

Steps 304-306: after the OCU receives the data message transmitted by the CNU, the OCU acquires the EPOC-LLID of the CNU from the data message, searches out the EPON-LLID corresponding to the EPOC-LLID according to the corresponding relationship between the EPOC-LLID and the EPON-LLID, replaces the EPOC-LLID in the data message with the searched out EPON-LLID, and caches the data message at the optical side of the OCU.

Step 307: the OLT allocates an uplink resource according to the EPON-LLID, and the optical side of the OCU transmits the data message to the OLT within a range of the resource.

Figure 4:
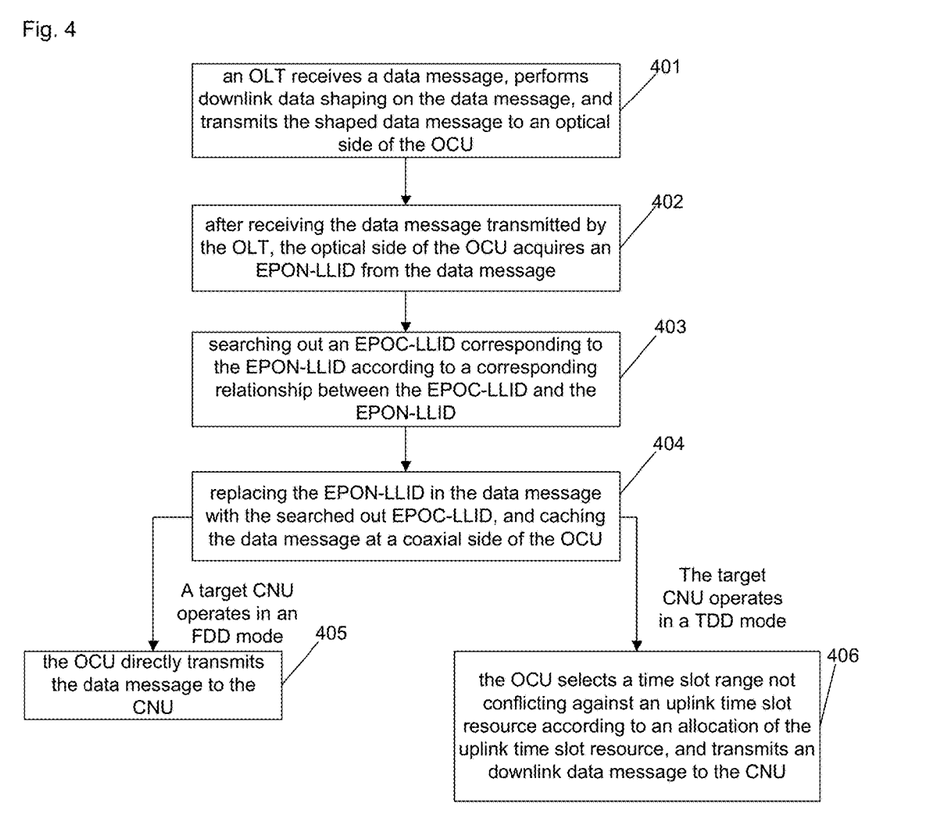
FIG. 4 is a flowchart of a method for scheduling a downlink data message in the PON and EOC networking according to an embodiment of the present disclosure.

FIG. 4 is a flowchart of a method for scheduling a downlink data message in a PON and EOC networking according to an embodiment of the present disclosure. As shown in FIG. 4, the method includes the following steps:

Step 401: the OLT receives the data message, performs downlink data shaping on the data message, and transmits the shaped data message to an optical side of the OCU.

In this embodiment, after the data message passes through a core network and a carrier network, and reaches the OLT, the OLT performs downlink data shaping according to a parameter configuration of the EPON-LLID corresponding to the EPOC-LLID of a target CNU of the data message. Herein, the parameter includes but is not limited to a CIR and a PIR, and the shaped data message is transmitted to the optical side of the OCU.

Herein, before the OLT receives the data message, the step further includes a power on initialization process of the CNU and the OCU, which includes:

the OCU allocates one or more coaxial side LLIDs for the CNU registered on the OCU according to the MPCP discovery process executed by the CNU, and the coaxial side LLIDs are identified by the EPOC-LLID.

The OLT acquires the number of the coaxial side LLIDs allocated by the OCU for CNU according to the MPCP discovery process executed by the OCU, and allocates, for the OCU, the optical network side LLIDs, the number of which is not less than the number of the coaxial side LLIDs, and transmits the allocated optical network side LLIDs to the OCU, and the optical network side LLIDs are identified by the EPON-LLID.

The OCU establishes and stores one to one mapping relationship between the EPOC-LLID and the EPON-LLID.

Steps 402-404: after receiving the data message transmitted by the OLT, an optical side of the OCU acquires the EPON-LLID from the data message, searches out the EPOC-LLID corresponding to the EPON-LLID according to a correspondence relationship between the EPOC-LLID and the EPON-LLID, replaces the EPON-LLID in the data message with the searched out EPOC-LLID, caches the data message at the coaxial side of the OCU; if the target CNU operates in the FDD mode, then Step 405 is executed; if the target CNU operates in the TDD mode, then Step 406 is executed.

Herein, before the optical side of the OCU searches out the corresponding EPOC-LLID according to the EPON-LLID of the data message, this step further includes: the OCU filters data messages according to the EPON-LLID. Because the data messages are too many, filtering is needed to find the data message with respect to this EPON-LLID. Further, the OCU finds the EPOC-LLID corresponding to the EPON-LLID through the correspondence relationship between the coaxial side LLID and the optical network side LLID stored in the OCU.

Step 405: the OCU directly transmits the data message to the CNU.

Herein, if the CNU operates in the FDD mode, the data message may be immediately transmitted to the CNU. If the CNU filters data messages according to the EPOC-LLID, then the CNU forwards the filtered data message to a related user terminal.

Step 406: the OCU selects a time slot range not conflicting against the uplink time slot resource according to an uplink time slot resource allocation, and transmits a downlink data message to the CNU.

With respect to the CNU of which an operating mode is the TDD mode, before the OCU forwards the downlink data message, the OCU needs to control forwarding of downlink data according to an allocation of the uplink time slot resource of the CNU so as to avoid conflict between uplink and downlink data.

Figure 5:
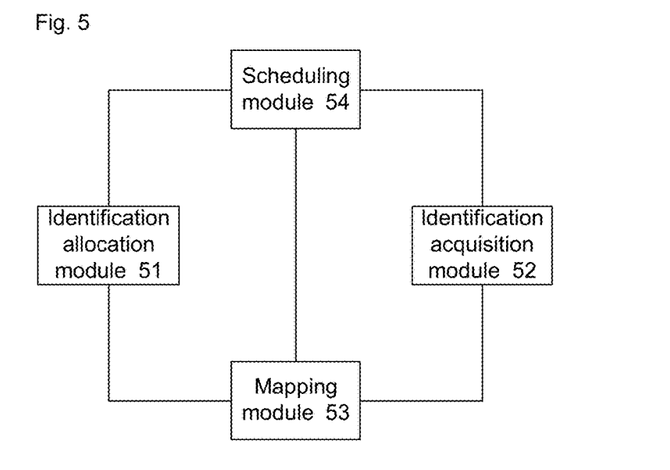
FIG. 5 is a structural schematic diagram of an OCU according to an embodiment of the present disclosure.

In order to achieve the above method, an embodiment of the present disclosure further provides an OCU. FIG. 5 is a structural schematic diagram of an OCU according to an embodiment of the present disclosure. As shown in FIG. 5, the OCU includes: an identification allocation module 51, an identification acquisition module 52, a mapping module 53, and a scheduling module 54.

The identification allocation module 51 is configured to allocate a coaxial side LLID for a CNU accessed to the OCU.

The identification acquisition module 52 is configured to acquire an optical network side LLID allocated for the OCU by an OLT.

The mapping module 53 is configured to establish a mapping relationship between the coaxial side LLID and the optical network side LLID.

The scheduling module 54 is configured to schedule a data message of the CNU according to the mapping relationship.

Preferably, the identification allocation module 51 is configured to allocate the coaxial side LLID for the CNU registered on the OCU, according to an MPCP discovery process executed by the CNU.

Preferably, the scheduling module 54 is configured to, after receiving the data message transmitted by the CNU, acquire the coaxial side LLID of the CNU from the data message, search out the optical network side LLID corresponding to the coaxial side LLID according to the mapping relationship between the coaxial side LLID and the optical network side LLID stored in the mapping module 53, replace the coaxial side LLID in the data message with the searched out optical network side LLID, and transmit the data message to the OLT.

Preferably, the scheduling module 54 is further configured to, after receiving the data message transmitted by the OLT, acquire the optical network side LLID from the data message, search out the coaxial side LLID corresponding to the optical network side LLID according to the mapping relationship between the coaxial side LLID and the optical network side LLID stored in the mapping module 53, replace the optical network side LLID in the data message with the searched out coaxial side LLID, and transmit the data message to the CNU.

Herein, in actual application, the OCU may be implemented by an optical connector and an electric cable together. The identification allocation module 51, the identification acquisition module 52, the mapping module 53, in actual application, may all be implemented by a Central Processing Unit (CPU), or a Digital Signal Processor (DSP), or a Field-Programmable Gate Array (FPGA) in the OCU. The scheduling module 54, in actual application, may be implemented by a transceiver or a transmitting and receiving antenna in the OCU, in combination with the CPU, or the DSP or the FPGA in the OCU.

Figure 6:
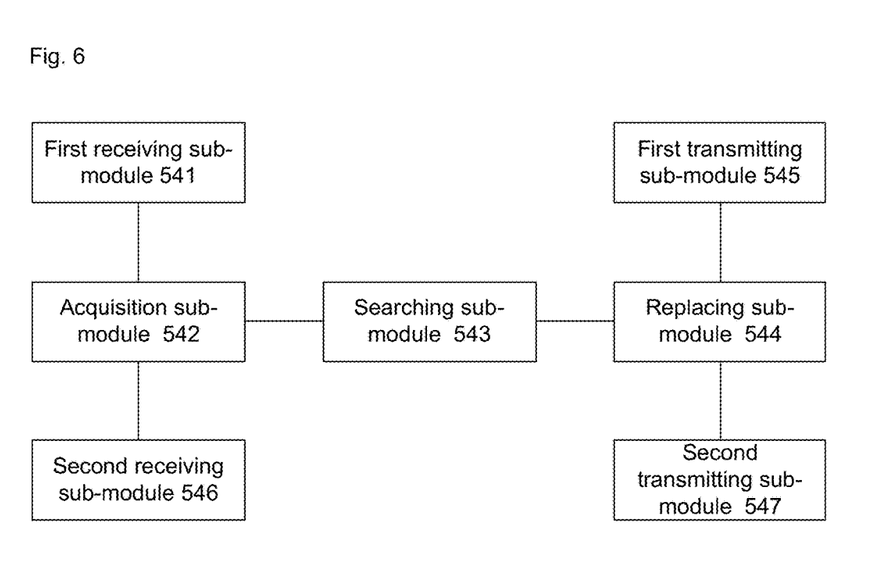
FIG. 6 is a structural schematic diagram of a scheduling module in an OCU according to an embodiment of the present disclosure.

FIG. 6 is a structural schematic diagram of a scheduling module in an OCU according to an embodiment of the present disclosure. As shown in FIG. 6, the scheduling module 54 includes: a first receiving sub-module 541, an acquisition sub-module 542, a searching sub-mode 543, a replacing sub-module 544, and a first transmitting sub-module 545.

The first receiving sub-module 541 is configured to receive the data message transmitted by the CNU.

The acquisition sub-module 542 is configured to acquire the coaxial side LLID of the CNU from the data message.

The searching sub-mode 543 is configured to search out the optical network side LLID corresponding to the coaxial side LLID according to the mapping relationship between the coaxial side LLID and the optical network side LLID stored in the mapping module 53.

The replacing sub-module 544 is configured to replace the coaxial side LLID in the data message with the searched out optical network side LLID, transmit the data message to the first transmitting sub-module 545.

The first transmitting sub-module 545 is configured to transmit the data message transmitted by the replacing sub-module 544 to the OLT.

Preferably, the scheduling module 54 further includes: a second receiving sub-module 546 and a second transmitting sub-module 547.

The second receiving sub-module 546 is configured to receive the data message transmitted by the OLT.

The acquisition sub-module 542 is configured to acquire the optical network side LLID from the data message.

The searching sub-module 543 is configured to search out the coaxial side LLID corresponding to the optical network side LLID according to the mapping relationship between the coaxial side LLID and the optical network side LLID stored in the mapping module.

The replacing sub-module 544 is configured to replace the optical network side LLID in the data message with the searched out coaxial side LLID, and transmit the data message to the second transmitting sub-module.

The second transmitting sub-module 547 is configured to transmit the data message transmitted by the replacing sub-module 544 to the CNU.

Herein, in actual application, the first receiving sub-module 541 and the second receiving sub-module 546 in the scheduling module 54 may both be implemented by a receiver or a receiving antenna in the OCU. In actual application, the first transmitting sub-module 545 and the second transmitting sub-module 546 may both be implemented by a transmitter or a transmitting antenna in the OCU. In actual application, the acquisition sub-module 542, the searching sub-module 543 and the replacing sub-module 544 may all be implemented by a CPU, or a DSP, or a FPGA in the OCU.

It should be understood by those skilled in the art that functions implemented by a respective processing module and a sub-module thereof in the OCU may be understood by referring to the above-mentioned data message scheduling method for the PON and EOC networking. It should be understood by those skilled in the art that functions of a respective module and a sub-module thereof in the OCU shown in FIGS. 5 and 6 may be implemented by a program operating on a processor, and may also be implemented through a specific logic circuit.

An embodiment of the present disclosure further provides a system for scheduling a data message in a PON and EOC networking, which includes: an OLT, an OCU, and a CNU.

The OCU is configured to allocate a coaxial side LLID for a CNU accessed to the OCU, and acquire an optical network side LLID allocated for the OCU by the OLT; establish a mapping relationship between the coaxial side LLID and the optical network side LLID, and schedule a data message of the CNU according to the mapping relationship.

The OLT is configured to allocate an optical network side LLID for the OCU.

The CNU is configured to acquire the coaxial side LLID allocated by the OCU.

Preferably, the OLT is configured to allocate, for the OCU, the optical network side LLID adaptive to the number of the coaxial side LLID according to the coaxial side LLID allocated for the CNU by the OCU, and transmit the allocated optical network side LLID to the OCU.

Preferably, the OCU is configured to allocate the coaxial side LLID for the CNU registered on the OCU, according to an MPCP discovery process executed by the CNU.

The OLT is configured to acquire a number of the coaxial side LLID allocated for the CNU by the OCU, according to an MPCP discovery process executed by the OCU, and allocate, for the OCU, the optical network side LLID of which the number is not less than that of the coaxial side LLIDs.

Herein, the number of the optical network side LLIDs allocated for the OCU by the OLT is controlled by the number of the coaxial side LLIDs allocated for the CNU by the OCU. For example, when five CNUs access to the OCU, the OCU allocates a coaxial side LLID for each one of the five CNUs. Then, the OLT allocates five optical network side LLIDs for the OCU according to the five coaxial side LLIDs allocated for the five CNUs by the OCU, transmits the optical network side LLIDs to the OCU, to allow, in the OCU, the coaxial side LLIDs and the optical network side LLIDs respectively allocated for the CNU to be one to one correspondence. Alternatively, the optical network side LLIDs which the number of is larger than five are allocated for the OCU, so that after the coaxial side LLIDs and the optical network side LLIDs are maintained to be one to one correspondence, at least one the optical network side LLID is remained. As such, when a new CNU accesses to the OCU, the OCU can have enough number of optical network side LLIDs to be mapped to a coaxial side LLID of the newly accessed CNU.

Preferably, the OCU is configured to after receiving the data message transmitted by the CNU, acquire the coaxial side LLID of the CNU from the data message, search out the optical network side LLID corresponding to the coaxial side LLID according to the mapping relationship between the coaxial side LLIDs and the optical network side LLIDs, replace the coaxial side LLID in the data message with the searched out optical network side LLID, and transmit the data message to the OLT.

Preferably, the OCU is further configured to, after receiving the data message transmitted by the OLT, acquire the optical network side LLID from the data message, search out the coaxial side LLID corresponding to the optical network side LLID according to the mapping relationship between the coaxial side LLIDs and the optical network side LLIDs, replace the optical network side LLID in the data message with the searched out coaxial side LLID, and transmit the data message to the CNU.

It should be apparently clear to those skilled in the art that the above individual modules and the above individual steps according to the present disclosure, may be implemented by a universal computing device, and they may be integrated in a single computing device, or be distributed in a network composed of multiple computing devices. Alternatively, they may be implemented by using computing device executable program codes, so that they may be stored in a storage device to be executed by the computing device. In certain situations, the steps shown and described may be executed in an order different from here, or they may be respectively manufactured into individual integrated circuit modules, or multiple modules or steps of them may be manufactured into a single integrated circuit module for implementation. In this way, the present disclosure is not limited to any specific combination of hardware and software.

All those described above are only preferred embodiments of the present disclosure, and are not used to limit the protection scope of the present disclosure. All modifications, equivalents, improvements, and so on made within the spirit and scope of the present disclosure should fall into the protection scope of the present disclosure.

INDUSTRIAL APPLICABILITY

According to the embodiments of the present disclosure, by establishing a corresponding relationship between coaxial side LLIDs and optical network side LLIDs, and scheduling a data message of the CNU according to the corresponding relationship, an optical network side and a coaxial side of the OCU are enabled to be separated effectively from each other, and an OLT in an existing PON may not be influenced, and an existing MPCP may not be modified, thereby implementing effective control and allocation for resources.

What is claimed is:

1. A method for scheduling a data message in a Passive Optical Network (PON) and Ethernet Over Cable (EOC) networking, comprising:
    allocating, by an Optical Coax Unit (OCU), one or more coaxial side Logical Link Identifiers (LLIDs) for one or more Coaxial Network Units (CNUs) having accessed the OCU, and acquiring one or more optical network side LLIDs allocated for the OCU by an Optical Line Terminal (OLT); and
    establishing a one to one mapping relationship between the coaxial side LLIDs and the optical network side LLIDs, and scheduling a data message of one of the CNUs according to the mapping relationship;
    wherein the step of acquiring the one or more optical network side LLIDs allocated for the OCU by the OLT comprises: allocating, by the OLT, the one or more optical network side LLIDs for the OCU according to the one or more coaxial side LLIDs allocated for the one or more CNUs by the OCU, and transmitting the allocated one or more optical network side LLIDs to the OCU;
    wherein the step of allocating, by the OLT, the one or more optical network side LLIDs for the OCU according to the one or more coaxial side LLIDs allocated for the one or more CNUs by the OCU comprises: acquiring, by the OLT, the number of the coaxial side LLIDs allocated for the one or more CNUs by the OCU, according to a Multi-Point Control Protocol (MPCP) discovery process executed by the OCU, and allocating, for the OCU, optical network side LLIDs of which the number is not less than that of the coaxial side LLIDs.

2. The method according to claim 1, wherein the step of allocating the one or more optical network side LLIDs for the OCU comprises: allocating, for the OCU, the optical network side LLIDs adaptive to the number of the coaxial side LLIDs.

3. The method according to claim 1, wherein the step of allocating, by the OCU, the one or more coaxial side LLIDs for the one or more CNUs having accessed the OCU comprises:
    allocating, by the OCU, the one or more coaxial side LLIDs for the one or more CNUs registered on the OCU, according to a MPCP discovery process executed by the CNUs.

4. The method according to claim 1, wherein the step of scheduling the data message of said one of the CNUs according to the mapping relationship comprises:
    after the OCU receives the data message transmitted by said CNU, acquiring the coaxial side LLID of said CNU from the data message, searching out the optical network side LLID corresponding to the coaxial side LLID according to the mapping relationship between the coaxial side LLIDs and the optical network side LLIDs, replacing the coaxial side LLID in the data message with the searched out optical network side LLID, and transmitting data message to the OLT.

5. The method according to claim 1, wherein the step of scheduling the data message of said one of the CNUs according to the mapping relationship comprises:
    after the OCU receives the data message transmitted by the OLT, acquiring the optical network side LLID from the data message, searching out the coaxial side LLID corresponding to the optical network side LLID according to the mapping relationship between the coaxial side LLIDs and the optical network side LLIDs, replacing the optical network side LLID in the data message with the searched out coaxial side LLID, and transmitting data message to said CNU.

6. An Optical Coax Unit (OCU), comprising: an identification allocation module, an identification acquisition module, a mapping module, and a scheduling module, wherein the identification allocation module is configured to allocate one or more coaxial side Logical Link Identifiers (LLIDs) for one or more Coaxial Network Unit (CNUs) having accessed the OCU;

the identification acquisition module is configured to acquire one or more optical network side LLIDs allocated for the OCU by an Optical Line Terminal (OLT): wherein the acquired one or more optical network side LLIDs is allocated by the OLT through acquiring the number of the coaxial side LLIDs allocated for the one or more CNUs by the OCU, according to a Multi-Point Control Protocol (MPCP) discovery process executed by the OCU; wherein the number of optical network side LLIDs is not less than the number of the coaxial side LLIDs;

the mapping module is configured to establish a one to one mapping relationship between the coaxial side LLIDs and the optical network side LLIDs; and the scheduling module is configured to schedule a data message of one of the CNUs according to the mapping relationship.

7. The OCU according to claim 6, wherein the identification allocation module is configured to allocate the one or more coaxial side LLIDs for the one or more CNUs registered on the OCU, according to a MPCP discovery process executed by the CNUs.

8. The OCU according to claim 6, wherein the scheduling module is configured to, after receiving the data message transmitted by said one of the CNU, acquire the coaxial side LLID of said CNU from the data message, search out the optical network side LLID corresponding to the coaxial side LLID according to the mapping relationship between the coaxial side LLIDs and the optical network side LLIDs stored in the mapping module, replace the coaxial side LLID in the data message with the searched out optical network side LLID, and transmit data message to the OLT.

9. The OCU according to claim 6, wherein the scheduling module is configured to, after receiving the data message transmitted by the OLT, acquire the optical network side LLID from the data message, search out the coaxial side LLID corresponding to the optical network side LLID according to the mapping relationship between the coaxial side LLIDs and the optical network side LLIDs stored in the mapping module, replace the optical network side LLID in the data message with the searched out coaxial side LLID, and transmit data message to said CNU.

10. A system for scheduling a data message in a Passive Optical Network (PON) and Ethernet Over Cable (EOC) networking, comprising: an Optical Line Terminal (OLT), an Optical Coax Unit (OCU), and a Coaxial Network Unit (CNU), wherein the OCU is configured to allocate one or more coaxial side Logical Link Identifiers (LLIDs) for one or more CNUs having accessed the OCU, and acquire one or more optical network side LLIDs allocated for the OCU by the OLT; establish a one to one mapping relationship between the coaxial side LLIDs and the optical network side LLIDs, and schedule a data message of the CNU according to the mapping relationship;

the OLT is configured to allocate the one or more optical network side LLIDs for the OCU; and the CNU is configured to access the OCU, and acquire the coaxial side LLID allocated by the OCU;

wherein the OLT is further configured to acquire the number of coaxial side LLIDs allocated for the CNUs by the OCU according to a Multi-Point Control Protocol (MPCP) discovery process executed by the OCU, and allocate, for the OCU, optical network side LLIDs of which the number is not less than that of the coaxial side LLIDs.

11. The system according to claim 10, wherein the OLT is configured to allocate, for the OCU, the optical network side LLIDs adaptive to the number of the coaxial side LLIDs according to the one or more coaxial side LLIDs allocated for the one or more CNUs by the OCU, and transmit the allocated optical network side LLIDs to the OCU.

12. The system according to claim 10, wherein the OCU is configured to allocate the one or more coaxial side LLIDs for the one or more CNUs registered on the OCU according to a MPCP discovery process executed by the CNUs.

13. The system according to claim 10, wherein the OCU is configured to, after receiving the data message transmitted by the CNU, acquire the coaxial side LLID of the CNU from the data message, search out the optical network side LLID corresponding to the coaxial side LLID according to the mapping relationship between the coaxial side LLIDs and the optical network side LLIDs, replace the coaxial side LLID in the data message with the searched out optical network side LLID, and transmit data message to the OLT.

14. The system according to claim 10, wherein the OCU is configured to, after receiving the data message transmitted by the OLT, acquire the optical network side LLID from the data message, search out the coaxial side LLID corresponding to the optical network side LLID according to the mapping relationship between the coaxial side LLIDs and the optical network side LLIDs, replace the optical network side LLID in the data message with the searched out coaxial side LLID, and transmit data message to the CNU.

* * * * *